United States Patent [19]

Chiu

[11] Patent Number: 4,729,070
[45] Date of Patent: Mar. 1, 1988

[54] ADJUSTABLE RING LIGHT
[76] Inventor: David Chiu, 33 Roslyn Ct., Port Jefferson, N.Y. 11777
[21] Appl. No.: 862,320
[22] Filed: May 12, 1986
[51] Int. Cl.⁴ ............................................. F21V 13/00
[52] U.S. Cl. ...................................... 362/33; 362/32; 362/227; 362/372; 362/804
[58] Field of Search .................... 362/32, 33, 227, 238, 362/249, 250, 362, 372, 804

[56] References Cited
U.S. PATENT DOCUMENTS

| | | | |
|---|---|---|---|
| 3,005,087 | 10/1961 | Klein | 362/250 |
| 3,225,184 | 12/1965 | Reiber | 362/33 |
| 3,887,801 | 6/1975 | Ilzig et al. | 362/33 |
| 4,025,777 | 5/1977 | Hayakawa | 362/250 |
| 4,591,953 | 5/1986 | Oram | 362/33 |

FOREIGN PATENT DOCUMENTS

| | | | |
|---|---|---|---|
| 2519426 | 8/1976 | Fed. Rep. of Germany | 362/804 |
| 0510162 | 4/1976 | U.S.S.R. | 362/804 |

Primary Examiner—Margaret A. Focarino
Attorney, Agent, or Firm—Leonard Belkin

[57] ABSTRACT

An adjustable ring light for concentrating multiple beams of light in which the point of convergence can be moved along an axis. In an embodiment, the light sources which may be the ends of bundles of optical fibers, are mounted in tiltable carriers which are adjusted by rotation of a housing cover. In other embodiments tilting is accomplished by bending tabs or rotating a disk having slots through which the light sources project.

11 Claims, 10 Drawing Figures

ADJUSTABLE RING LIGHT

BACKGROUND OF THE INVENTION

This invention relates to an adjustable ring light and more particularly to an adjustable ring light capable of changing the angle of incidence of the light beams so as to permit concentrating the light on a subject which is moved without having to move the light sources.

There are a variety of situations where it is necessary to concentrate multiple beams from a light holder (i.e., a ring light) to insure adequate lighting conditions, such as an object being examined under a microscope or in an operating room during the conduct of a surgical procedure in a confined location.

At the present time the concentration of light is usually accomplished by mounting multiple sources of light in a fixture such as a ring light with the light beams coming together at a point. Typically the fixture itself is mounted so as to permit its movement in order to concentrate the multiple sources of light on the object or location where required.

Mountings which are designed to accomplish this are usually complex and sometimes cumbersome to use, and generally occupy considerable space, whereas in many situations the space available is quite limited and not completely adequate or suitable for such a mounting.

A variety of U.S. patents have been issued which illustrate earlier efforts to permit the concentration of multiple light beams on a work area. In U.S. Pat. Nos. 3,360,640 and 3,437,803 are shown universal type mountings. U.S. Pat. Nos. 3,500,054 and 3,806,256 described arrangements in which the light sources are mounted on a movable frame. In U.S. Pat. No. 3,786,243 a swivel joint is employed, and in U.S. Pat. No. 4,447,114 a rotational configuration is described.

SUMMARY OF THE INVENTION

The present invention overcomes or reduces many of the problems associated with existing multiple light source holders by incorporating into a ring light provision for adjusting the location where the multiple light beams come together without having to move the holder.

In a preferred embodiment of this invention there is provided adjustable illuminating apparatus for concentrating multiple beams of light at a predetermined point comprising a ring shaped housing with a plurality of annularly arranged spaced openings. Within the housing at each opening is a holder for a light source for a beam of light directed out of the opening. A disk member within the housing has slots to engage each of the holders and a spring is utilized to bias each of the holders so that the light beams emanating from the sources converge at some point away from the housing. A cover for the housing is threadably engaged with the latter and has a cam surface to contact the light holders and overcome adjustably the bias to alter the angle of incidence of the beams of light thereby permitting the point at which the light beams converge to be moved along an axis.

In other embodiments of the invention a variety of arrangements internal to the housing are provided to effect the change in the angle of incidence of the light beams.

In this invention the focal point for the light beams is made adjustable without the necessity of providing any complex or unwieldy mounting arrangements to accomplish this result. As a consequence, there is provided a compact and relatively simple arrangement having minimal spatial requirements for permitting the adjustment of multiple light beams to converge at a preselected point without the need for moving the whole unit in which the multiple light sources are mounted.

It is thus a principal object of this invention to provide an adjustable ring light for focusing multiple light beams.

Other objects and advantages of this invention will hereinafter become obvious from the following detailed description of the preferred embodiments of this invention.

DETAILED DESCRIPTION OF THE PREFERRED EMBODIMENT

Figure 1:
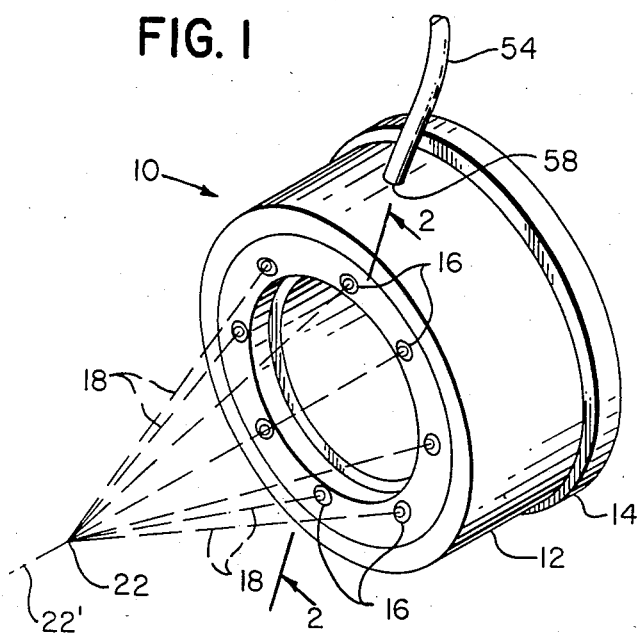
FIG. 1 is an isometric view of a ring light embodying the principles of this invention.

Referring to FIG. 1, there is illustrated an adjustable illuminator or ring light 10 incorporating the principles of this invention. As seen in this figure, light 10 consists of a ring shaped housing 12 and a matching cover 14. Housing 12 is provided with a plurality of equispaced annularly arranged openings 16 from which beams 18 of light emerge and converge at a point or small region 22 on the central axis of said housing 12. As will be seen from the description which follows, the light sources within housing 12 may be adjusted to move the point at which light beams 18 converge, such as to point 22', without having to move ring light 10.

Referring to FIGS. 2-5, housing 12 consists of a cylindrical section 24 from which extends an annular U-shaped section 26 with an outer wall 28. Section 26 is provided with threads 32 to accommodate cover 14 which will be described below.

Figure 3:
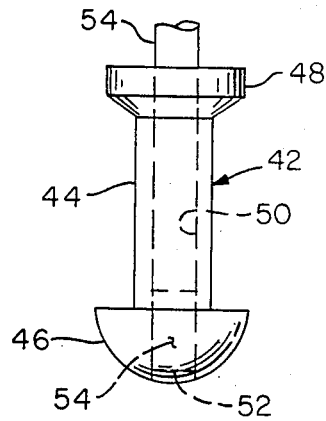
FIG. 3 is a detail of a light holder.

The bottom of section 26 has a pair of canted surfaces 34 and 36, the latter of which contains openings 16 previously identified. Within housing 12 adjacent openings 16 are formed spherical sockets 38 in each of which is located one end of light holder 42. The latter, as also seen in FIG. 3, is a member consisting of a barrel 44 having a ball shaped portion 46 at one end and a protuberance 48 at the other end. A cylindrical opening 50 extends through holder 42 to accommodate light source 52.

Each light source 52 is formed from the end of a bundle 54 of light conductors formed by glass fibers which join all of the bundles of light conductors to form a single bundle 57 which leaves housing 12 through an opening 58. As is understood in the art, at a remote location a light generator such as an incandescent bulb (not shown) would supply light to the end of bundle 54 and the light is delivered by way of the glass fibers to ends 52 which for the purpose of this invention constitute the sources of light for beams 18.

Referring back to FIG. 2, it will be noted that ball shaped portion 46 of holder 42 and spherical socket 38 surrounding each hole 16 comprise a ball and socket joint so that holder 42 can readily be tipped to any convenient angle as will hereinafter be explained to change the direction of light beam 18.

Figure 2:
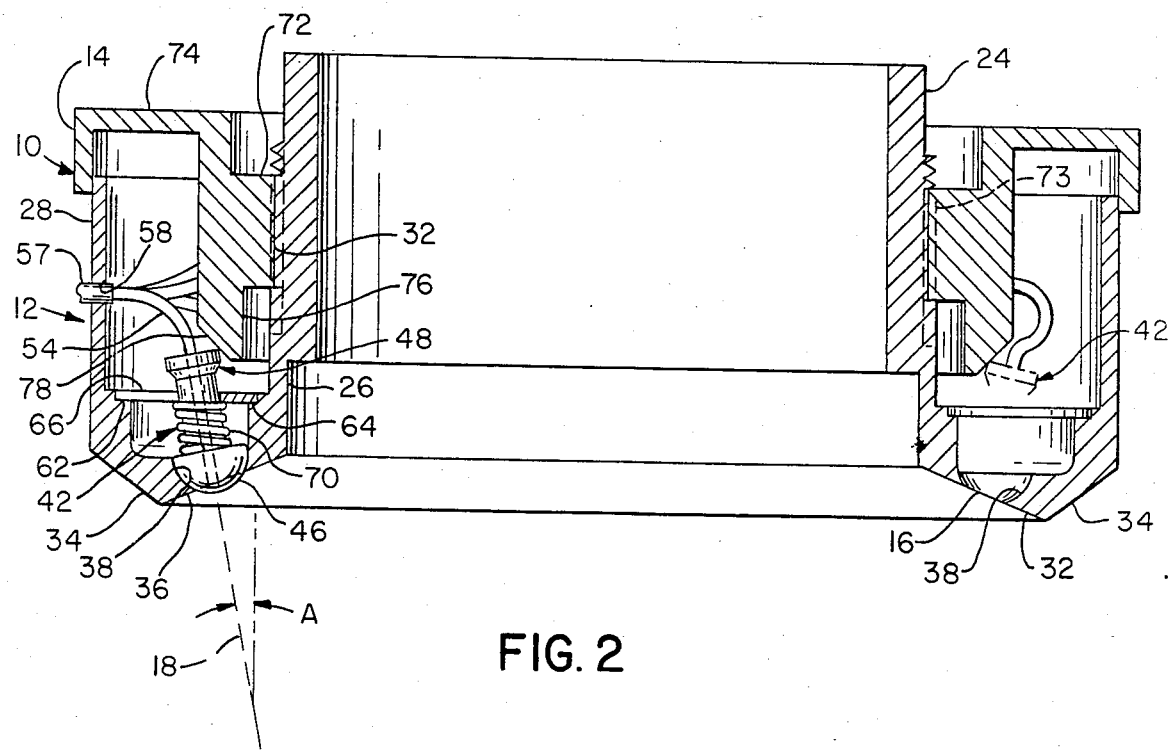
FIG. 2 is a view along 2—2 of FIG. 1.
Figure 4:
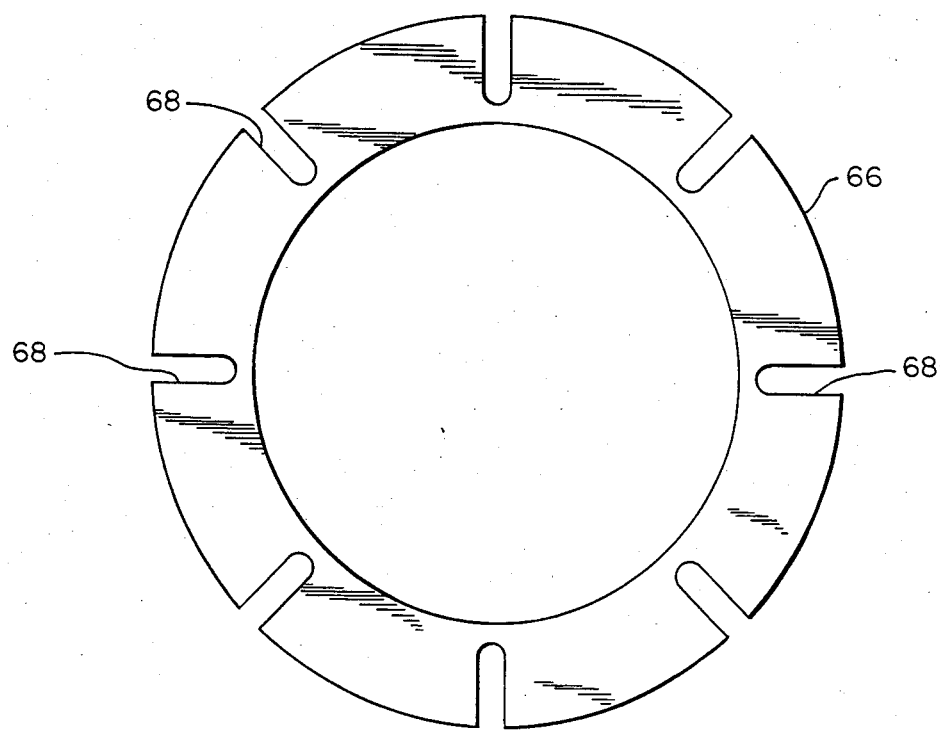
FIG. 4 is a plan view of the disk which orients the light holders.

It will be noted in FIG. 2 that a pair of annular shoulders 62 and 64 are formed within housing 12 surrounding openings 16. On these shoulders are mounted a flat, annular disk 66 whose details are shown in FIG. 4. Disk 66 is provided with a plurality of radially extending slots 68 aligned with openings 16 so that each light holder 42 extends through a slot 68. Slots 68 insure that holders 42 can be tipped in the socket only in a radial direction. That is, with ball portion 46 of holder 42 resting in socket 38, movement of holder 42 insures that light beams 18 change direction only in a plane passing through the central axis of ring light 10 and through the center of its opening 16. A spring 70 for each holder 42 between disk 66 and ball section 46 biases holder 42 in place and against the inner end of slot 68, as seen in FIG. 2.

Figure 5:
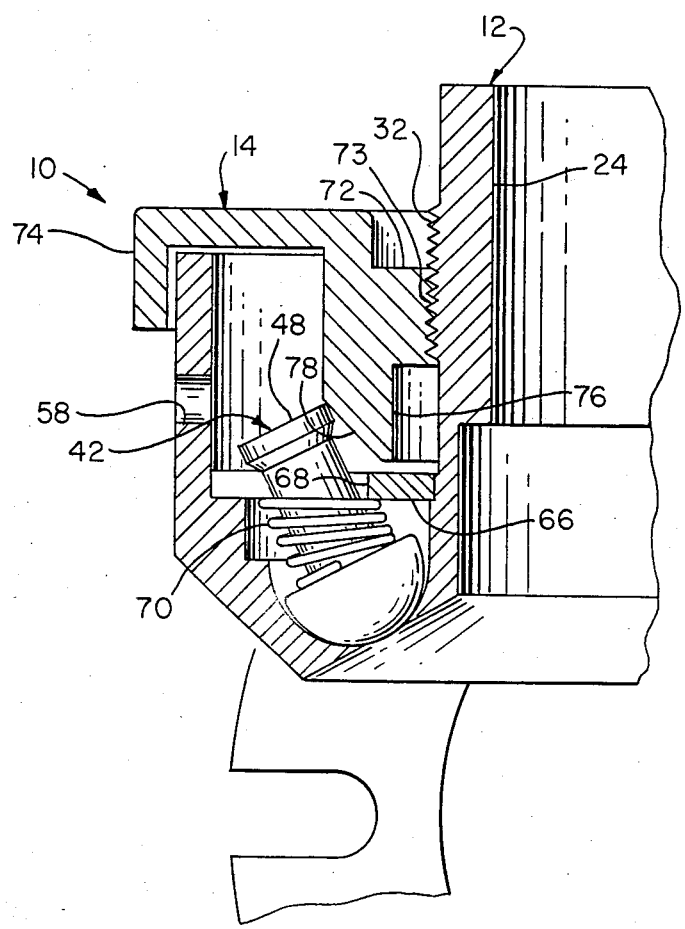
FIG. 5 is a detail of FIG. 2 showing how the angle of incidence of a light beam is altered.

In order to effect the repositioning of holders 42, housing 12 is provided with cover 14 which consists of a central portion 72 which surrounds cylindrical section 24 and has threads 73 to engage threads 32 on section 24. An inverted U-section 74 encloses the opening into housing 12, while an annular, downwardly extension 76 is directed toward holders 42. A cam surface 78 is formed on the bottom of extension 76 to contact protuberance 48 on each light holder 42. As seen in FIG. 2, holder 42 is in one extreme position, against the inner end of slot 68 in disk 66 so that beam 18 makes the smallest angle A with the central axis of ring light 10. With all holders 42 in this position, beams 18 come together at a point such as 22' in FIG. 1 furthest from light 10. As cover 14 is rotated clockwise so that cam surface 78 moves down in contact with holder 42, the upper end of the latter is swivelled outwardly in slot 68 (the protuberance end moving outwardly as seen in FIG. 5) so that beam 18 makes an increasing angle A with the result that the point at which beams come together moves closer to light 10, for example, point 22 in FIG. 1.

Thus, it is possible to move the focal point 22 of the beams along the central axis of light 10 merely by grasping U-section 74 on the outside and rotating cover 14.

Housing 12 and its cover 14 may be each constructed of a single piece of a light weight material such as aluminum. When completely assembled, light 10 is compact and light in weight and easy and convenient to adjust. It may be supported in any convenient and conventional manner not forming a part of this invention, such as a ring (not shown) surrounding outer wall 28.

Other possible configurations are possible without departing from the principles of this invention. For example, FIGS. 6 and 7 show an arrangement wherein a ring light 100 with adjustable focusing of light beams can be made even more compact.

Figure 6:
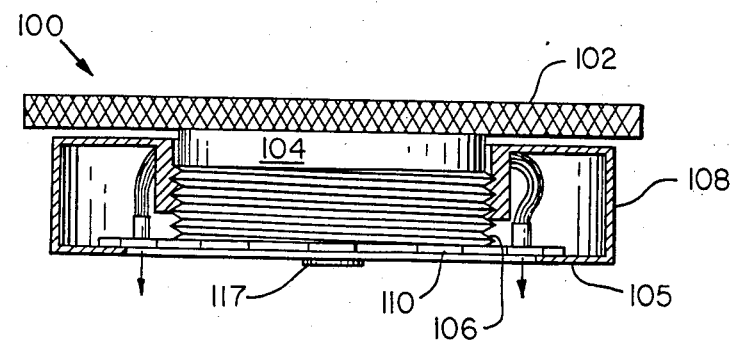
FIG. 6 is an elevation view in partial section of an alternative embodiment.
Figure 7:
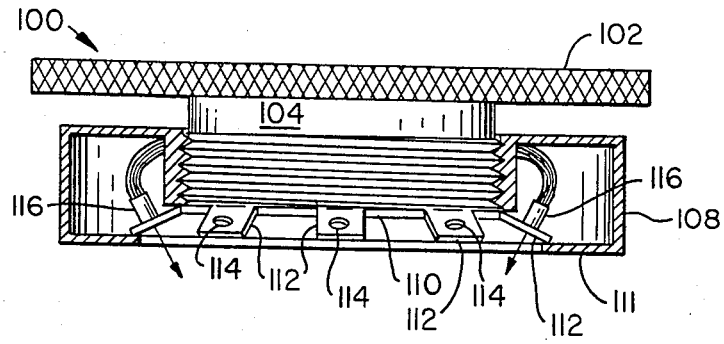
FIG. 7 is a view similar to that of FIG. 6 with the angle of the light sources changed.

Referring to FIGS. 6 and 7, light 100 consists of a plate 102 with a knurled rim having a solid cylindrical body 104 extending downward with a threaded portion 106. A hollow annular member 108 threadably engaged with body 104 engages a plate 110 attached to the bottom lip 111 of body 104, plate 110 having annularly arranged tabs 112 with openings 114 to support light sources 116 as shown in only two of the tabs for clarity. By rotating knurled plate 102 with respect to annular member 108 as seen in FIG. 7, tabs 112 are bent thereby causing the beams of light leaving light sources 112 to change their angle of direction and hence the point at which they converge. It is understood that plate 110 is attached to body 104 with means such as a pin 117 to permit rotation of the plate With respect to body 104.

Figure 8:
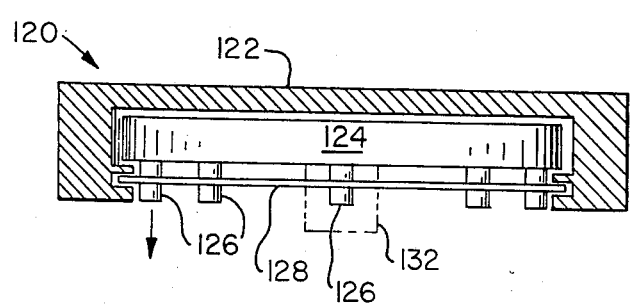
FIG. 8 is an elevation view in partial section of another alternative embodiment.
Figure 9:
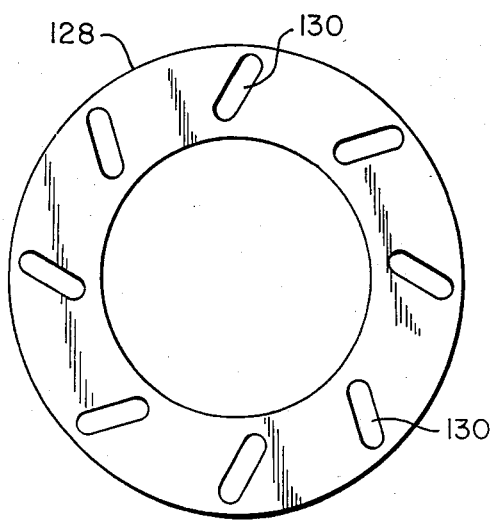
FIG. 9 is a plan view of the disk used in FIG. 8.
Figure 10:
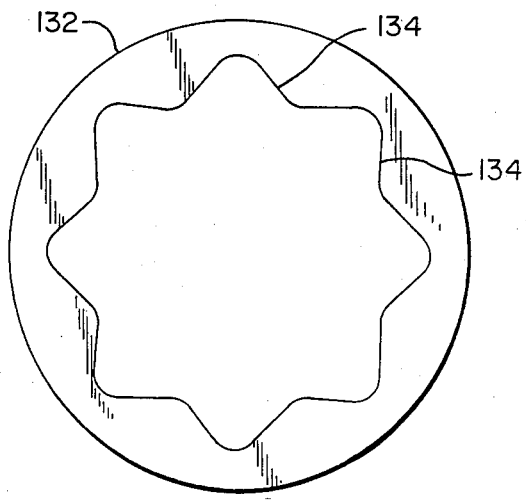
FIG. 10 is a plan view of an alternative disk for use in FIG. 8.

Another compact configuration is illustrated in FIGS. 8 and 9. In this arrangement, illuminator 120 consists of a body 122 with a dished out section to accommodate a solid circular plate 124 on which is mounted extended downwardly a plurality of annularly arranged projections 126 to support light sources of the type previously described. Plate 124 and projections 126 may be made from a single section of resilient, silicone rubber type material. A hollow, circular plate 128, also seen in FIG. 9, is provided with identical slots 130 at an angle to any radii of disk 128. Each projection 126 passes through a slot 130. Disk 128 is fixed along its edges to body 122. A handle 132 may protrude from plate 124. By grasping handle 132 and rotating body 122, projections 126 will be bent inwardly by slots 130 if projections 126 are initially at the outer extremeties of the slots and plate 128 is rotated as shown by the arrow in FIG. 9 with respect to body 122 seen in FIG. 9. The same effect can be accomplished by employing disk 132 shown in FIG. 10 for that of disk 128 seen in FIG. 9 in the configuration illustrated in FIG. 8. Disk 132 is provided with camming edges 134 to produce the same effect of slots 130 in disk 128. Plate 124 with projections 126 return to their original shape when body 122 is rotated back due to the elastic characteristics of the material.

From the embodiments of the invention described above it is seen that there has been provided an adjustable ring light of compact and economic design with the capability of adjusting or moving the point at which the beams of light converge thereby avoiding the necessity of providing a cumbersome adjustable supporting structure which occupies space which in many situations may be restricted.

While only certain preferred embodiments of this invention have been described, it is understood that many variations of the invention are possible without departing from the principles of this invention as defined in the claims which follow.

What is claimed is:

1. Adjustable illuminating apparatus for concentrating multiple beams of light at a predetermined point comprising:
   a. housing means having a plurality of annularly arranged spaced openings;
   b. means within said housing means for supporting a source of a light beam at each of said openings;
   c. means for biasing each of said supporting means to direct the light from each source out through said openings to converge;
   d. adjusting means on said housing means to contact said supporting means and overcome said biasing means to pivot each of said supporting means thereby to alter selectively along an axis the region at which the beams of light from said sources converge; and e. said biasing means comprising disk means having radially directed slots mounted within said housing means with each of said supporting means passing through one of said slots for limiting the direction of movement of said supporting means caused by said adjusting means so that the region of convergence of said light beams is adjustable along said axis.

2. The illuminating apparatus of claim 1 in which said biasing means further comprises spring means for each of said supporting means engaged with said disk means to bias said supporting means in the direction such that said beams of light converge at the most distant region and said adjusting means acts to move said region closer to said illuminating apparatus.

3. The illuminating apparatus of claim 1 in which said adjusting means comprises a cover means for enclosing and threadably engaged to said housing means.

4. The illuminating apparatus of claim 3 in which said cover means includes an annularly arranged camming surface to contact all of said supporting means and pivot the latter in said slots as said camming surface is rotated and moved into said housing as a result of threading said cover means into said housing means.

5. The illuminating apparatus of claim 4 in which each of said supporting means has a central opening to accommodate a light source, the end of said supporting means adjacent its opening in said housing means formed into an annular spherical surface surrounding said central opening, and the surface in said housing surrounding said opening forming a spherical socket, so that a ball and socket joint is formed by one end of said supporting means and said housing means, said supporting means when being tilted about said ball and socket joint thereby effecting the change in direction of the light beam from said source out of said opening.

6. Illuminating apparatus for concentrating multiple beams of light at a predetermined point comprising:
   a. means having a central axis for supporting a plurality of annularly arranged spaced sources of light beams;
   b. means enclosing said supporting means for adjusting simultaneously the angle of said sources so as to effect the movement of said point along said axis; and
   c. a disk attached to said enclosing means within said supporting means for carrying an annular array of tabs whose outer extremities are in contact with said housing means, means in said tabs to mount said sources to direct said beams to converge at said point, and means to effect movement of said enclosing means with respect to said supporting means to change the angle of said tabs thereby to change the angle of said beams of light and move along an axis their point of convergence.

7. The illuminating apparatus of claim 6 in which said housing and enclosing means are threadably engaged so that rotation of one with respect to the other causes movement of said point of convergence.

8. Illuminating apparatus for concentrating multiple beams of light at a predetermined point comprising:
   a. means having a central axis for supporting a plurality of annularly arranged spaced sources of light beam projecting from said supoprting means;
   b. means enclosing said supporting means for adjusting simultaneously the angle of said sources so as to effect the movement of said point along said axis, and
   c. disk means attached to said enclosing means being penetrated by said sources, whereby rotation of said enclosing means with respect to said supporting means causes said sources to contact a portion of said disk means to tilt and thereby change the angle of light beams and move their point of convergence.

9. The illuminating apparatus of claim 8 in which said disk means is provided with a plurality of slots at an angle to radii thereof through which said sources pass.

10. The illuminating apparatus of claim 8 in which said disk means is provided with camming edges to effect the tilt of said sources.

11. Adjustable illuminating apparatus for concentrating multiple beams of light at a predetermined point comprising:
   a. housing means having a plurality of annularly arranged spaced openings;
   b. means within said housing means for supporting a source of a light beam at each of said openings;
   c. means for biasing each of said supporting means to direct the light from each source out through said openings to converge,
   d. adjusting means on said housing means to contact said supporting means and overcome said biasing means to pivot each of said supporting means thereby to alter selectively along an axis the region at which the beams of light from said sources converge; and
   e. disk means in contact with said supporting means to limit movement of said sources so that all light beams pass through said axis.

* * * * *